Jan. 14, 1936.  C. G. EISENBERG, JR  2,027,421
VEHICLE BODY AND HOIST STRUCTURE
Filed June 11, 1934  4 Sheets-Sheet 1

INVENTOR.
C. G. Eisenberg, Jr.
BY Morsell, Lieber & Morsell
ATTORNEYS.

Jan. 14, 1936. C. G. EISENBERG, JR 2,027,421
VEHICLE BODY AND HOIST STRUCTURE
Filed June 11, 1934 4 Sheets-Sheet 2

INVENTOR.
C. G. Eisenberg, Jr.
BY
Morsell, Liebert & Morsell
ATTORNEYS.

Jan. 14, 1936.  C. G. EISENBERG, JR  2,027,421
VEHICLE BODY AND HOIST STRUCTURE
Filed June 11, 1934  4 Sheets-Sheet 3
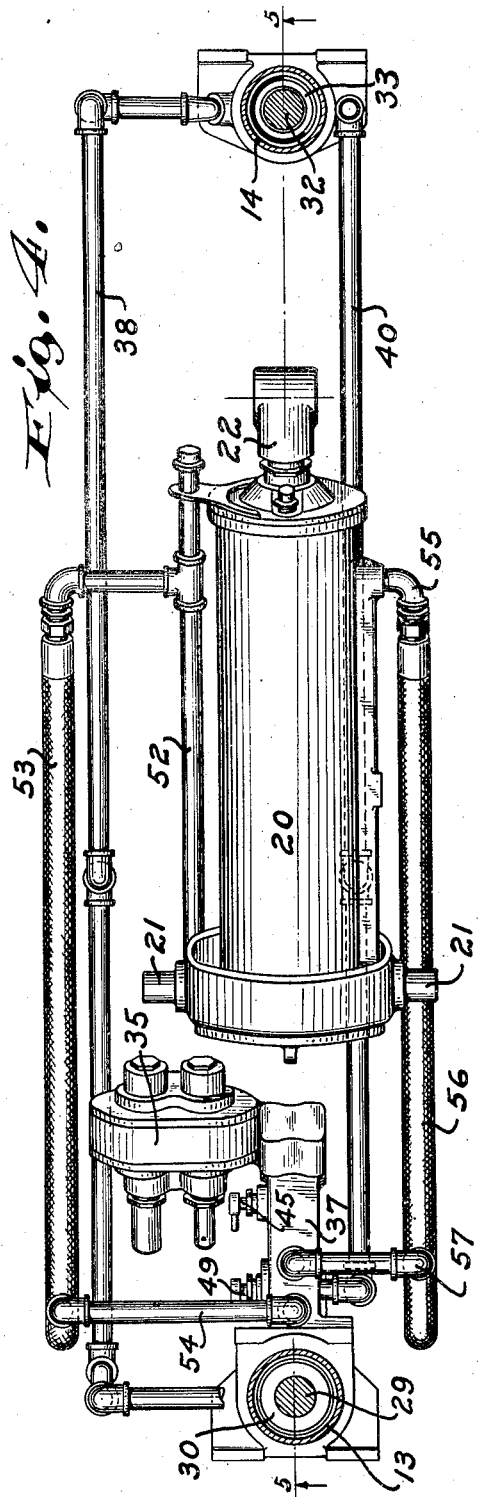
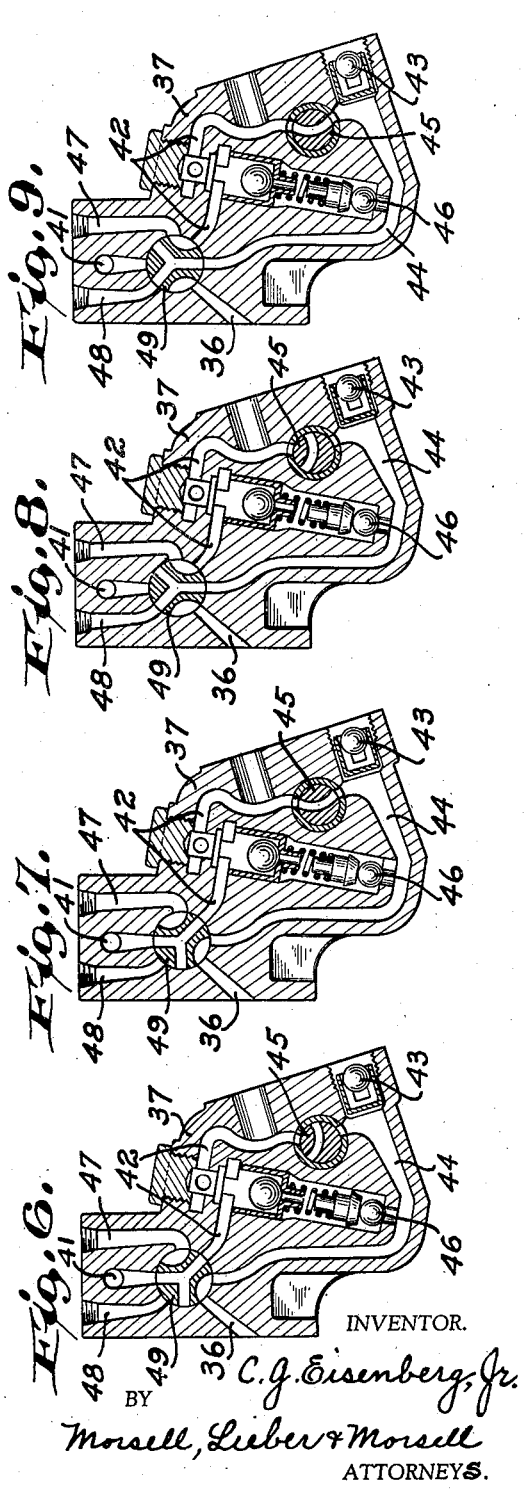
INVENTOR.
C. G. Eisenberg, Jr.
BY
Morsell, Lieber & Morsell
ATTORNEYS.

Jan. 14, 1936.  C. G. EISENBERG, JR  2,027,421
VEHICLE BODY AND HOIST STRUCTURE
Filed June 11, 1934    4 Sheets-Sheet 4

INVENTOR.
C. G. Eisenberg Jr.
Morsell, Lieber & Morsell
ATTORNEY.

Patented Jan. 14, 1936

2,027,421

UNITED STATES PATENT OFFICE 2,027,421

VEHICLE BODY AND HOIST STRUCTURE

Charles G. Eisenberg, Jr., Wauwatosa, Wis., assignor to The Heil Co., Milwaukee, Wis., a corporation of Wisconsin Application June 11, 1934, Serial No. 730,024

11 Claims. (Cl. 214—65)

The present invention relates generally to an improved system of handling and transporting materials, and relates more specifically to an improved body structure for trucks or the like, and to improved mechanism for elevating, tilting and lowering the body structure.

Generally defined, an object of the invention is to provide an improved vehicle body and manipulating structure therefor, which is simple and durable in construction and which is moreover highly flexible and effective in use.

In the handling and transportation of materials in bulk with the aid of trucks or similar vehicles, it is frequently necessary with the ordinary type of truck having the body permanently attached thereto, to maintain the relatively expensive vehicle inactive while the body is being loaded and unloaded. In some industries, the quantity of material being handled makes it necessary with this prior method, to have a large number of costly trucks available, primarily because of such necessary inactivity of the vehicle during loading and unloading. It is also frequently desired to have the truck equipped with mechanism such as a hydraulic hoist for tipping the carrier body so as to discharge the contents by dumping, and when such dumping mechanism is provided, the body is ordinarily permanently attached to the vehicle and necessitates maintaining the same inactive at least while the body is being loaded.

It is a more specific object of the present invention to provide an improved detachable dump body structure for vehicles such as trucks, wherein the body may be entirely removed from its transporting truck, during loading, so that a single truck may be utilized to serve as a transferring and dumping medium for a number of carrier bodies without necessarily maintaining the vehicle idle during loading of the several individual bodies.

Another specific object of the invention is to provide an improved truck body, and improved mechanism for positioning the body upon and for removing the same from the chassis of a truck or other vehicle.

A further specific object of the invention is to provide improved hoisting and tilting mechanism for material transporting bodies or the like, which may be readily manipulated to effect either raising, dumping or lowering of the carrier.

Still another specific object of the invention is to provide an improved hydraulic hoist system for dump trucks or the like, which may be utilized to cooperate with a group of carrier bodies in a manner whereby maximum efficiency is obtainable from the trucking unit.

These and other objects and advantages of the invention will be apparent from the following detailed description.

A clear conception of the construction and mode of utilizing the improved body and hoist structures constituting the present improvement, may be had by referring to the drawings accompanying and forming a part of this specification in which like reference characters designate the same or similar parts in the various views:

Fig. 4 is an enlarged top view of the hydraulic hoisting mechanisms which are mounted upon the rear end of the truck chassis;

Fig. 6 is a further enlarged section through the control valves of the hoisting system, showing the valves set for straight vertical lifting of the body;

Fig. 7 is a similarly enlarged section through the control valves of the hoisting system, showing the same set for direct lowering of the entire body;

Fig. 8 is a likewise enlarged section through the control valves of the system, showing the same set for upward tilting of the body; and Fig. 9 is a similar section through the control valves, showing the same set for downward return of the body from tilted position.

While the invention has been shown and described herein as being applied to a specific type of trucking system wherein the carrier bodies are adapted to be elevated, lowered, and tilted by means of hydraulic servo-motors or hoists, it is not intended to restrict the scope by such specific embodiment, since some of the novel features are obviously more generally applicable.

Figure 1:
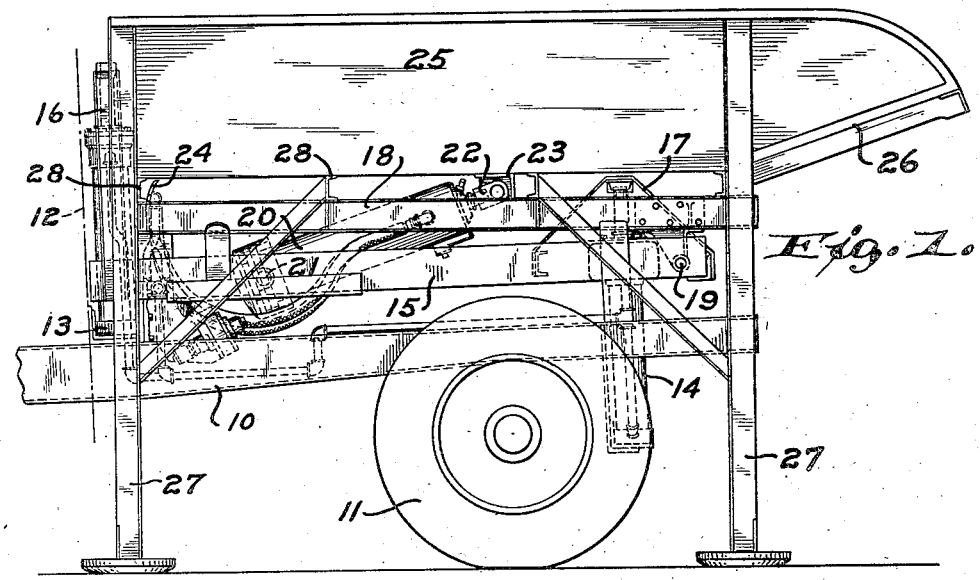
Fig. 1 is a somewhat diagrammatic side view of the rear end of a truck having one of the improved hoisting systems applied thereto, and showing the same about to elevate one of the improved body structures from the ground.
Figure 2:
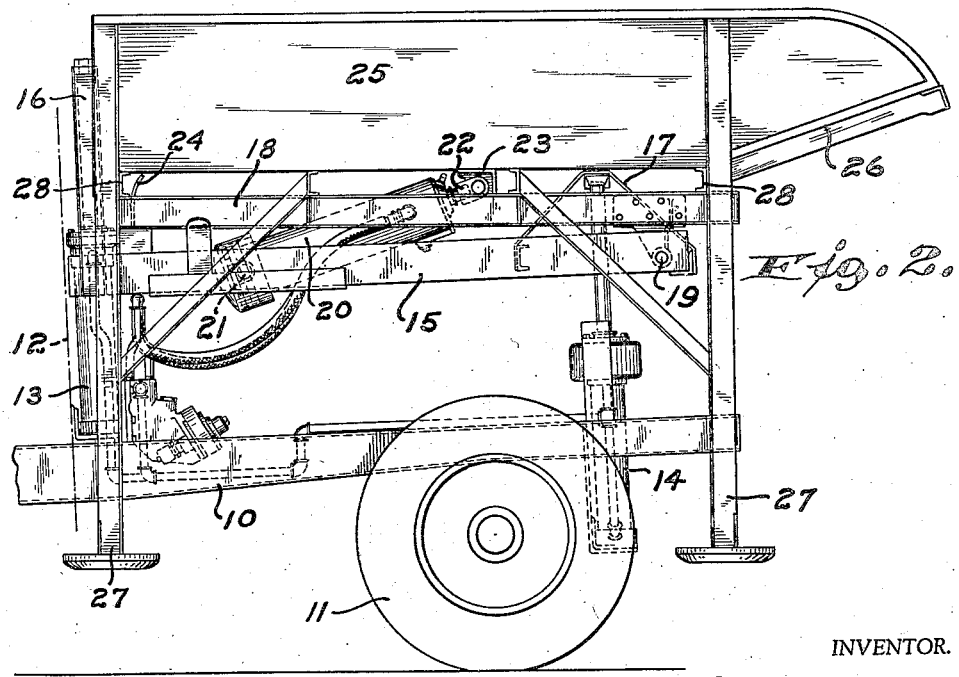
Fig. 2 is a similar view of the truck, hoist and body assemblage, showing the body lifted vertically from the ground and being borne by the truck.
Figure 3:
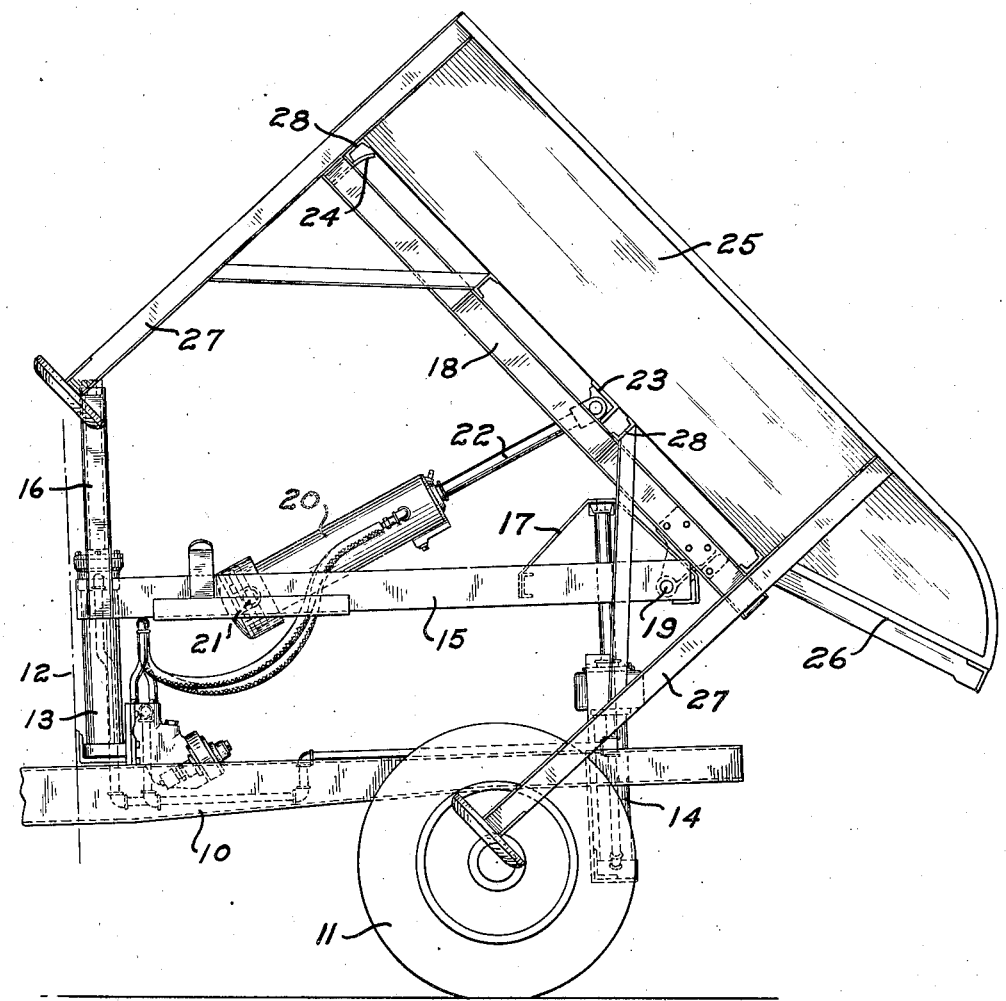
Fig. 3 is another similar view of the truck, hoist and body assemblage, showing the body in the act of being tilted, for end dumping purposes.

Referring to Figs. 1, 2 and 3 of the drawings, the truck which is of the ordinary motor propelled type, comprises generally a chassis 10 supported upon rear wheels 11 in the usual manner, the propelling motor being mounted upon the front of the chassis 10 and being controllable from a driver's cab which terminates at the dot-and-dash line 12. Mounted upon the chassis 10 rearwardly of the cab line 12, is a set of elevating and lowering hoists 13, 14, these hoists being supported by cross-braces rigidly attached to the chassis 10. The front hoist 13 is located directly in back of the cab and is disposed higher than the rear hoist 14 of the set, for clearance purposes; and the pistons and rods of these hoists are simultaneously movable in the same direction, and are connected respectively to the front and rear portions of a vertically movable horizontally disposed support 15, by means of yokes 16, 17. A body supporting and tilting frame 18 is disposed above and has its rear end pivotally attached to the movable support 15, by means of a pivot pin 19; and this frame 18 which is normally movable with the support 15, is also tiltable relative thereto, by means of another hoist 20 the cylinder of which is pivotally suspended from the support 15 by means of trunnions 21. The piston rod 22 of the tilting hoist 20, is pivotally connected to a cross-piece 23 secured to the frame 18, and this frame also has a transverse end stop 24, both of these elements being cooperable with a special body 25 adapted to rest loosely upon the frame structure.

There may be any desired number of similar bodies 25, these being interchangeably cooperable with the supporting frame structure just described. Each of the bodies 25 comprises an upper receptacle having a spouted end 26, and four corner supports or legs 27 adapted to rest directly upon the ground and to maintain the body spaced from the ground line. The legs 27 are so spaced, and are of sufficient height to permit the entire rear end of the truck, including the wheels 11, to be inserted beneath the body proper, when the main support 15 and frame 18 have been lowered as far as possible. After the frame 18 has been positioned beneath the body, the hoists 13, 14 may be operated to elevate the frame 18 into supporting engagement with the lower beams 28 of the body 25 as shown in Fig. 1, and when the frame 18 has been thus positioned, the stop 24 is in operative engagement with the rear beam 28, while the cross-piece 23 is in substantial contact with the medial lower portion of the body 25. By subsequently manipulating the hoisting mechanisms in a manner to be later described, the body 25 may be elevated as shown in Fig. 2, and tilted for end dumping as shown in Fig. 3, without danger of having the body structure either interfere with the advancing movement of the truck, or become displaced upon its supporting frame 18. The body 25 which merely rests by gravity upon the frame 18 and is not positively connected thereto, may at any time be released from the truck, by merely lowering the support 15 and frame 18 sufficiently so that the stop 24 and cross-piece 23 will clear the beams 28 while the legs 27 are resting upon the ground and the truck is advanced forwardly from beneath the body structure.

Figure 5:
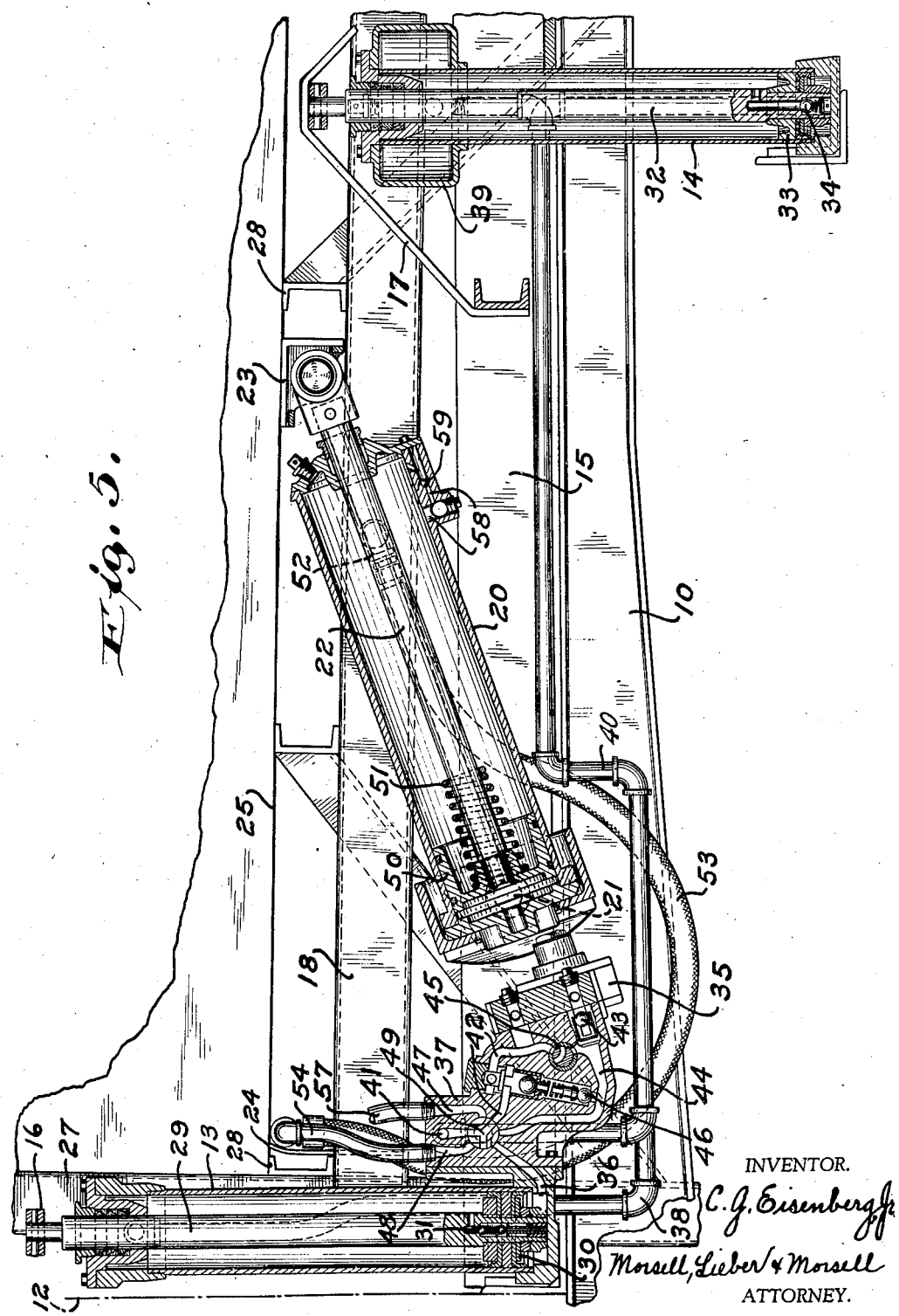
Fig. 5 is a similarly enlarged central vertical longitudinal section through the hoisting mechanisms, taken along the line 5—5 of Fig. 4.

The improved hoisting mechanisms, which are of the hydraulic or fluid pressure actuated types, are shown in detail in Figs. 4 to 9 inclusive. As previously indicated, the cylinders of the elevating and lowering hoists 13, 14 are fixedly supported by the chassis 10 and these hoists coact with the main support 15 through front and rear yokes 16, 17. The yoke 16 connects the front end of the support 15 with the upper end of the front hoist piston rod 29 the lower end of which carries a piston 30, and has therein a small by-pass controlled by a check valve 31. The yoke 17 connects the rear portion of the support 15 with the upper end of the rear hoist piston rod 32 the lower end of which carries a piston 33, and has therein a similar by-pass controlled by a check valve 34. The displacement chamber below the piston 30 of the front hoist 13 is communicable with a pump 35 through a port 36 formed in a valve casing 37, as shown in Fig. 5; and the displacement chamber above this piston 30 is constantly in open communication with the displacement chamber below the piston 33 of the rear hoist 14 through a pipe 38. The displacement chamber above the rear hoist piston 33 at all times communicates with an auxiliary reservoir 39 which is communicable with the suction side of the pump 35 through a pipe 40 and a port 41 formed in the casing 37, and all of these chambers, pipes 38, 40, ports 36, 41, and at least a portion of the reservoir 39, are normally constantly filled with fluid such as oil. While Fig. 5 purports to be a central longitudinal section through the hoisting mechanisms, and the pipe 40 in fact lies in front of the plane of the section as indicated in Fig. 4, this pipe 40 has been shown in Fig. 5 as well as in Fig. 4, in order to more clearly illustrate the connections between the front and rear hoists 13, 14 and the manner in which these hoists are associated with the valve casing 37.

The pump 35 is of the gear type adapted to be driven in a well-known manner, by the propelling motor of the truck; and has a suction port in open communication with a port 42 formed in the casing 37, and a discharge port communicable past a discharge valve 43 with a port 44 formed in the casing 37. The ports 42, 44 are directly connectable by means of a manually operable by-pass valve 45, and are also automatically communicable either in emergency cases, or for unloading when the pump 35 is maintained in operation after the support 15 has been fully elevated, past an unloading valve 46. The casing 37 is also provided with ports 47, 48, the function of which will be subsequently explained, and a special manually operable control valve 49 is adapted to connect certain of the casing ports in order to control the operation of the hoisting mechanisms. When the special control valve 49 is set as shown in Figs. 5, 6 and 7, the port 36 is in open communication with the pump discharge through the port 44, and the pump suction is in open communication with the oil supply reservoir 39 through the pipe 40 and the intercommunicating ports 41, 42. With the by-pass valve 45 set as shown in Figs. 5 and 6, there is no free or unrestrained communication between the ports 42, 44; but when this valve 45 is adjusted to the position shown in Fig. 7, the ports 42, 44 are in open communication with each other.

As previously indicated, the mechanism for tilting the frame 18 to dump the contents from the body 25, comprises a single hoist 20 having a piston rod 22 pivotally connected to a crossbeam 23 which is secured to the frame 18 forwardly of its pivot 19. The lower end of the piston rod 22 carries a piston 50 and is embraced by a coil buffer spring 51 as shown in Fig. 5, this spring 51 serving to start the piston 50 and rod 22 on its downward journey after a body 25 has been emptied. The lower displacement chamber of the hoist 20 communicates through a pipe 52, tube 53 and pipe 54 with the casing port 48, whereas the upper displacement chamber of this hoist 20 is simultaneously communicable through a pipe 55, tube 56 and pipe 57 with the casing port 47, as shown in Figs. 4 and 5. When the control valve 49 is adjusted to the position shown in Figs. 8 and 9, the casing port 48 is brought into communication with the discharge port 44 of the pump 35, and the port 47 is simultaneously connected to the pump suction port 42, while the ports 36, 41 are cut out of communication with the pump. The body tilting hoist system just described is also provided with sufficient fluid such as oil, so that the pump 35 which actuates both sets of hoisting mechanisms, will have an abundant supply of fluid for body tilting purposes, and the upper end of the cylinder of the hoist 20 may also be provided with ports 58 having a check valve 59 therein which facilitates initial return of oil to the space above the piston 50 during lowering thereof.

During the normal use of the improved apparatus the single truck may be utilized for the purpose of transferring and dumping any number of the bodies 25, so that several of these bodies may be loaded at the same time that the truck is transferring and dumping one of them. The mode of applying the body 25 to the truck, has been previously generally described and when such application of a body 25 to the truck is taking place, the valve 49 is positioned as shown in Figs. 6 and 7 and the valve 45 is positioned as shown in Fig. 6. With the valves 45, 49 positioned as shown in Fig. 6, operation of the pump 35 will cause the same to withdraw oil from the space above the piston 33 and from the reservoir 39 through the pipe 40, port 41, valve 49, and port 42. The oil after passing through the pump 35 is delivered past the discharge valve 43 and through the port 44, valve 49 and port 36 to the displacement chamber beneath the piston 30 of the hoist 13, thus causing the piston 30 to rise. The rising piston 30 forces the oil from the upper displacement chamber of the hoist 13 through the pipe 38 into the lower displacement chamber of the hoist 14, thus causing the piston 33 to simultaneously rise with the piston 30. The pistons rods 29, 32 of the hoists 13, 14 therefore elevate the main support 15, the frame 18, and the body 25 resting upon this frame, in a vertical direction and this elevation continues until the pistons 30, 33 reach the upper limits of travel. If the operation of the pump continues after complete elevation of the pistons has thus been effected, and there is excess oil available for the pump 35, the unloading valve 46 will function to cut off the supply of oil from the reservoir 39 and to relieve the pump from excess pressure. If the pump 35 is stopped after complete elevation of the hoists 13, 14 has been effected, these hoists will remain in elevated condition and may be locked in such position by adjusting the valve 49 from the position shown in Fig. 6 to that shown in Fig. 8.

Lowering of the hoists 13, 14 may be conveniently effected without stopping the operation of the pump 35, by merely adjusting the by-pass valve 45 to the position shown in Fig. 7. With the by-pass valve thus adjusted, the oil under pressure from the displacement chamber of the hoist 13 may escape through the port 36, valve 49 port 44, and valve 45, to the suction port 42, from whence the oil may travel through the valve 49, port 41, and pipe 38, to the reservoir 39. The oil from beneath the piston 33 of the hoist 14 will simultaneously escape through the pipe 38 to the displacement chamber above the piston 30, thus causing the weight of the support 15, frame 18, and body 25, to move the pistons 30, 33 downwardly until they reach the bottoms of their respective cylinders. If the pump 35 is in operation during such lowering of the hoists 13, 14, the oil discharged past the valve 43 merely circulates through the valve 45 and does not interfere with the displacement of oil from the hoist cylinders. The check valves 31, 34 merely function to automatically maintain sufficient quantities of oil in the several displacement chambers, and the use of the reservoir 39 is primarily necessitated by the fact that the piston rods of the hoists 13, 14 reduce the volumes of the upper displacement chambers of these hoists.

The tilting mechanism for the frame 18 and body 25 is operable by the same pump 35 which elevates the body support. In order to effect tilting of the frame 18, the valve 49 may be adjusted to the position shown in Fig. 8, while the valve 45 is closed. The pump 35 will then withdraw oil from the displacement chamber above the piston 50 of the hoist 20 through the pipe 55, tube 56, pipe 57, port 47, valve 49, and port 42. The oil thus withdrawn from above the piston 50 will be forced by the pump past the valve 43 through the port 44, valve 49, port 47, pipe 54, tube 53, and pipe 52 to the displacement chamber beneath the piston 50, thus causing the piston rod 22 to move the cross-beam 23 upwardly and to tilt the frame 18 about its pivot 19. As the piston 50 reaches the upper extremity of its stroke, the spring 51 engages the cylinder head of the hoist 20 and becomes compressed. When the piston 50 has reached its upper limit, continued operation of the pump 35 will again result in the unloading action previously described, and the body 25 will then be tilted to its extreme position as illustrated in Fig. 3.

In order to return the frame 18 and body 5 to normal position, it is necessary only to adjust the valve 45 to the position shown in Fig. 9, without manipulating the valve 49. When such adjustment of the valve 45 is made, the spring 51 will immediately become effective to force the piston 50 downwardly to a sufficient extent that the oil from beneath this piston may return to the displacement chamber above the piston through the ports 58. The weight of the frame 18 and body 25 will subsequently be sufficient to move the piston 50 downwardly and to displace the oil beneath this piston through the pipe 52, tube 53, pipe 54, port 48, valve 49, port 44, and valve 45, to the ports and pipes communicating with the upper displacement chamber of the hoist 20.

As previously indicated, the check valve 59 will facilitate this return of the oil during lowering of the hoist 20, and the lowering operation continues until the frame 18 has reached the position illustrated in Fig. 5.

From the foregoing description of the operation of the improved hoisting structure, it will be apparent that a mere adjustment of the control valve 49 permits interchangeable elevation and lowering, or tilting of a body 25 supported by the mechanism, at the will of the operator. The same pump 35 which may be driven from the propelling motor of the vehicle, serves both of these purposes, in spite of the fact that the tilting may be effected independently of the elevating, and vice versa. During the hoisting and tilting of the body 25, this body merely rests loosely upon the frame 18 and is prevented from shifting relative thereto by the stop 24. The valves 45, 49 control each and every operation of the hoisting mechanism, and are readily accessible for manipulating. The improved mechanisms have proven highly successful in actual commercial operation, and while a single control valve 49 has been shown in the present specific embodiment, it will be apparent that separate control valves may be utilized for the elevating and tilting hoisting mechanisms. With the present improvement, a single truck having the improved hoisting mechanisms associated therewith, may be utilized to handle numerous bodies 25 with minimum loss of time, and if it is not desired to utilize the tilting mechanism for dumping purposes, the apparatus may readily be utilized only for the purpose of transferring bodies 25 from one locality to another.

It should be understood that it is not desired to limit the invention to the exact details of construction herein shown and described, for various modifications within the scope of the claims may occur to persons skilled in the art.

It is claimed and desired to secure by Letters Patent:—

1. In combination, a vehicle, a vertically movable support carried by said vehicle, a set of hoists spaced apart longitudinally of the vehicle for elevating said support, the front hoist of said set being disposed higher than the rear hoist, a tiltable frame carried by said support, a tilting hoist for said frame carried by and movable with said support, a carrier body detachably mountable upon said frame, and common power means for actuating all of said hoists.

2. In combination, a vehicle, a vertically movable support carried by said vehicle, a set of hoists spaced apart longitudinally of the vehicle for elevating said support, the front hoist of said set being disposed higher than the rear hoist, a tiltable frame carried by said support, a tilting hoist for said frame carried by and movable with said support, and a carrier body detachably mountable upon said frame.

3. In combination, a vehicle having a chassis and rear wheels associated therewith, an upwardly movable support carried by said chassis, a set of hoists spaced apart longitudinally of the vehicle for elevating said support, one of said hoists being disposed forwardly of said rear wheels and the other being located rearwardly thereof, a tiltable frame carried by and swingable relative to said support, a tilting hoist for said frame carried by and movable with said support, and a carrier body detachably mountable upon said frame.

4. In combination, a vehicle having a chassis and rear wheels associated therewith, an upwardly movable support carried by said chassis, a set of hoists spaced apart longitudinally of the vehicle for elevating said support, one of said hoists being disposed forwardly of said rear wheels and above the chassis and the other being located rearwardly of said wheels and extending partially below the chassis, a tiltable frame carried by and swingable relative to said support about a pivot located rearwardly of said rear hoist, a tilting hoist for said frame carried by and movable with said support, and a carrier body detachably mountable upon said frame.

5. In combination, a vehicle having a chassis and rear wheels associated therewith, an upwardly movable support carried by said chassis, a pair of vertically disposed hoists mounted upon said chassis and spaced apart longitudinally thereof for elevating said support, one of said hoists being disposed above said chassis forwardly of said rear wheels and the other being located within and partially below said chassis rearwardly of said wheels, a tiltable frame carried by and swingable relative to said support, an inclined tilting hoist for said frame carried by and movable with said support, a carrier body detachably mountable upon said frame, and common power means for actuating all of said hoists.

6. In combination, a vehicle having a chassis and a rear axle and wheels associated therewith, an upwardly movable support disposed above said chassis adjacent to said wheels, a pair of hydraulic hoists spaced apart longitudinally of the vehicle for elevating said support, the front hoist being disposed above said chassis forwardly of said axle and support and the rear hoist being located beneath said support partially below said chassis and rearwardly of said axle, a tiltable frame carried by and swingable relative to said support about a rear end pivot, an inclined hydraulic hoist carried by said support for tilting said frame, and a carrier body detachably mountable upon said frame.

7. In combination, a vehicle having a chassis and a rear axle and wheels associated therewith, an upwardly movable support disposed above said chassis between said wheels, a pair of hydraulic hoists spaced apart longitudinally of the chassis for elevating said support, the front hoist being disposed above said chassis forwardly of said axle and the rear hoist being located partially below said chassis rearwardly of said axle, a tiltable frame carried by said support, a hydraulic hoist carried by said support for tilting said frame, and a carrier body detachably mounted upon said frame.

8. In combination, a vehicle having a chassis and a rear axle and wheels associated therewith, an upwardly movable support disposed above said chassis between said wheels, a pair of hydraulic hoists spaced apart longitudinally of the chassis for elevating said support, the front hoist being disposed above said chassis forwardly of said axle and the rear hoist being located partially below said chassis rearwardly of said axle, a tiltable frame carried by and swingable relative to said support, and an inclined hydraulic hoist carried by said support for tilting said frame.

9. In combination, a vehicle having a chassis and a rear axle and wheels associated therewith, an upwardly movable support disposed above said chassis adjacent to said wheels, a pair of vertical hydraulic hoists spaced apart longitudinally of the vehicle for elevating said support, the front hoist being disposed above said chassis forwardly of said axle and the rear hoist being located partially below said chassis rearwardly of said axle, and a tiltable frame carried by and swingable relative to said support.

10. In combination, a vehicle having a chassis and a rear axle and wheels associated therewith, an upwardly movable support disposed above said chassis adjacent to said wheels, and a pair of vertical hydraulic hoists spaced apart longitudinally of the vehicle for elevating said support, the front hoist being disposed above said chassis forwardly of said axle and support and the rear hoist being located beneath said support partially below said chassis and rearwardly of said axle.

11. In combination, a vehicle having a chassis and a rear axle associated therewith, an upwardly movable support disposed above said chassis adjacent to said axle, and a pair of hydraulic hoists mounted upon and spaced apart longitudinally of said chassis for elevating said support, the front hoist being disposed entirely above said chassis forwardly of said axle and the rear hoist being located partially below said chassis and rearwardly of said axle.

CHARLES G. EISENBERG, Jr.